F. YOUNG
Sept. 30, 1930. ROOF FLASHING Re. 17,818
Original Filed Aug. 8, 1927
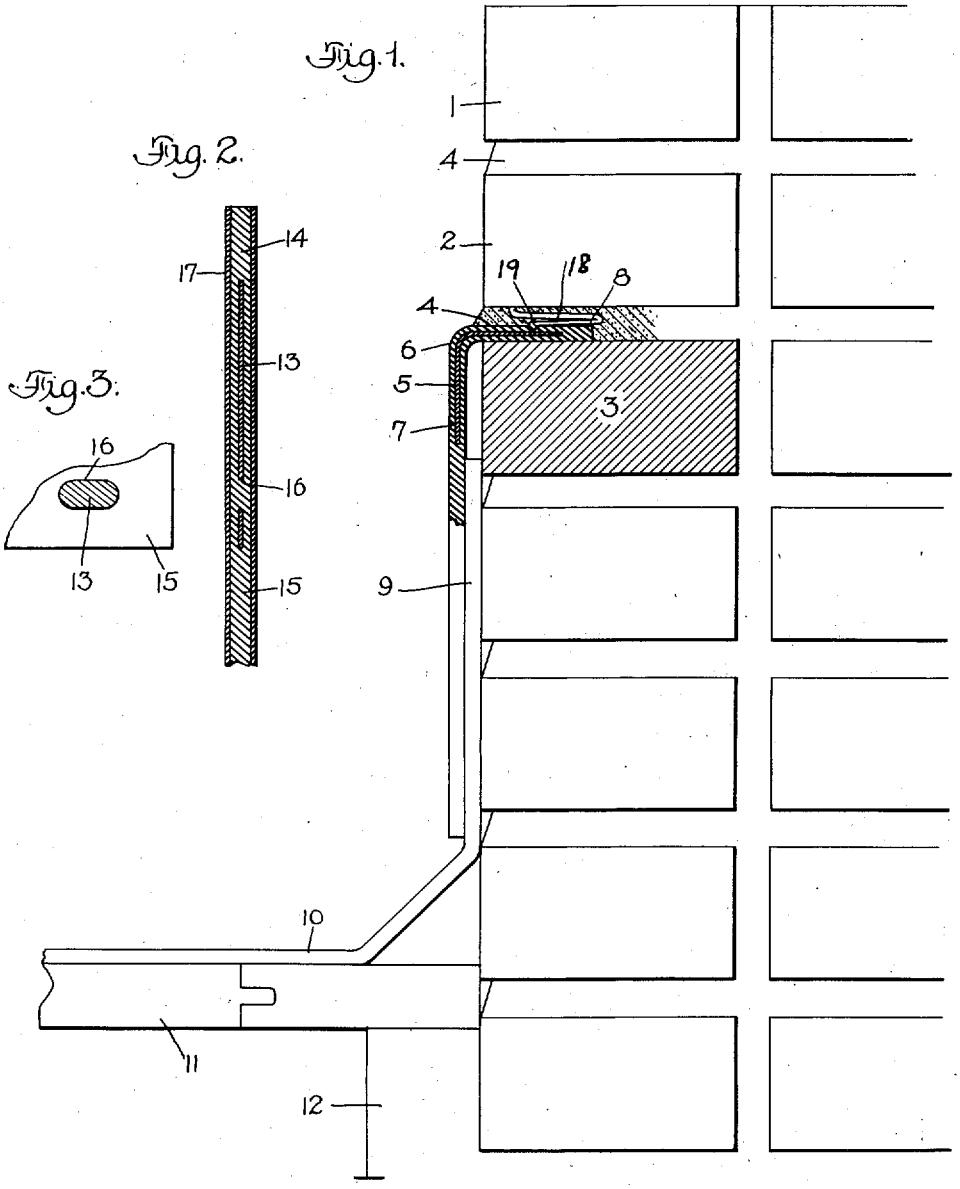
Inventor
Frank Young
By Deane and Custer
his Attorney Reissued Sept. 30, 1930 Re. 17,818

UNITED STATES PATENT OFFICE

FRANK YOUNG, OF LOGANSPORT, INDIANA

ROOF FLASHING

Original No. 1,700,619, dated January 29, 1929, Serial No. 211,495, filed August 8, 1927. Application for reissue filed June 4, 1930. Serial No. 459,233.

This invention relates to flashing sheets for use in the roofs of buildings, and has for its object the production of means for making a waterproof and permanent joint between adjacent parts of a roof, as for instance the vertical face of a wall and an adjacent flat roof surface in what is thought to be an unusually cheap and effective manner, by combining parts of special construction and arrangement hereinafter described.

In the accompanying drawings the preferred form of this invention is illustrated, and Fig. 1 represents a wall in vertical section having this invention applied to the wall and shown likewise in vertical section. Fig. 2 is a vertical section of a portion of a flashing sheet made in accordance with this invention in slightly modified arrangement, and Fig. 3 is a fragmentary detail view showing the aperture in the metal reinforce plate or sheet engaging the material of the flashing sheet to prevent displacement.

Throughout the drawings and description the same number is used to refer to the same part.

Considering the drawings, Fig. 1, the bricks 1, 2 and 3 are laid as in any vertical wall, with mortar 4 between them. The flashing sheet 5 made in accordance with this invention has a bend 6 and a reinforce metal piece 7 which is also bent with the flashing sheet and the bent end is introduced into the mortar 4. The flashing sheet 5 may be formed of asphalt, pitch, tar or a combination of these or similar plastic materials such as are used in roofing compositions and which can be made in any color and in units of any desired length or width. It will be noted that the material of the flashing sheet in the mortar and designated by number 8 extends beyond the edge of the sheet metal piece 7, and that it is solid to the end. This construction is intended to prevent any moisture reaching the metal piece 7, which may be of cheap bendable sheet iron. It cannot rust and will give as long service as more expensive metal. It is practicable to employ the ordinary sheet iron of which stove pipes are made, as it bends freely without breaking and is cheap. In Fig. 1 it will be further observed that the sheet metal piece 7 is covered on both faces by the material of the flashing sheet 5, and that the extension of that sheet beyond the edges of the piece 7 are made solid and of some extent. Those extended and solid portions of the material of the flashing sheet cannot split or separate and no moisture can enter.

As set out in Fig. 1 the downwardly extending portion of the flashing sheet 5 covers the upwardly projecting portion 9 of the composite roofing, or any other roofing located correspondingly so that the rain cannot splash or work up between them. The horizontal portion of the roofing is marked 10. It rests in the customary manner upon the roof deck sheathing 11 carried by the joist 12 or like supports.

In Fig. 2 the construction of this invention is shown as slightly modified. The sheet metal reinforce piece 13 is covered as before on both faces by the material of the flashing sheet 15, and the end 14 of that sheet is made solid for a distance beyond the edge of the sheet 13 as already explained. Under certain conditions it is desirable to prevent any considerable movement of the metal plate 13 and the material of the flashing sheet 15, whether this is caused by expansion and contraction or compression. The metal piece 13 and the plastic composition of which the flashing sheet is mainly composed, do not expand and contract equally, and in order that the plate may not be displaced with respect to the enclosing flashing sheet, or to a very limited extent, an aperture 16 may be provided, or more than one aperture, through the metal piece and the material of the flashing sheet extended solidly through the aperture. This arrangement will substantially secure the metal piece in its place. The construction is also shown in Fig. 3.

The portion referred to by number 17 in Fig. 2 is a cap or counter flashing of any material applied to the flashing sheet 15 externally.

Again considering Fig. 1, there will be noted one of the wire clips 18 embedded in the mortar 4, and having an end or point 19 pressed into engagement with the material of the flashing sheet 5. The purpose of the clip or clips is to hold the bend end of the flashing in place in the mortar.

The operation of this invention is believed to be made clear by the drawings and the foregoing explanation. The metal reinforce pieces are located at the bends and reinforce the flashing at the external angles thereof. The metal pieces are fully guarded against entering moisture, and are permanent. By the use of this invention it is believed that flashing in roofs may be left for an almost unlimited time without any attention whatsoever.

While I have described my improved flashing sheet as applied to a joint between a vertical face wall and an adjacent flat roof surface, it will be understood that such sheet may also be used in other roof structures where it is desired to provide a waterproofing strip having a permanently shaped reinforced angle margin but with a substantial portion of its area being of normal flexibility, both of which portions are adapted to cooperate with adjacent parts of the roof structure as desired.

Having now described this invention and explained the mode of using it, I claim:—

1. A flashing sheet having a relatively wide body adapted for vertical disposition in overlapping relation to adjacent roofing, an inwardly extending attaching portion at the upper end of said body, a metallic plate of angular formation completely embedded in the sheet adjacent the upper end thereof only and extending partly into said body and partly into said attaching portion, whereby the major portion of the body is below said plate and is of normal flexibilty.

2. As an article of manufacture, a composite roofing strip of waterproofing material having a relatively wide body adapted for overlapping relation to adjacent roofing, an angular extending portion along one edge of said body, a metallic plate of angular formation completely embedded in the sheet at the angular extending portion only, and extending partly into said body and partly into said angular extending portion, and the major portion of the body being of normal flexibility below said plate.

3. As an article of manufacture, a composite roofing strip having a body of relatively flexible waterproofing material adapted for overlapping relation to adjacent roofing and having an angularly extending portion along one edge of said body, a metallic plate of angular formation completely embedded in said sheet at the angular extending portion only, a substantial portion of the body beyond said plate being of normal flexibility.

Signed by me at Logansport, Indiana, this 31st day of May, A. D. 1930.

FRANK YOUNG.